United States Patent

Klemenhagen

[15] 3,680,293
[45] Aug. 1, 1972

[54] REEL MOWER BLADE ADJUSTMENT

[72] Inventor: Dale A. Klemenhagen, Minneapolis, Minn.

[73] Assignee: Toro Manufacturing Corporation, Minneapolis, Minn.

[22] Filed: Aug. 11, 1969

[21] Appl. No.: 849,035

[52] U.S. Cl. .................................................56/249
[51] Int. Cl. ............................................A01d 55/20
[58] Field of Search....................56/249, 251, 253

[56] References Cited

UNITED STATES PATENTS

| 3,144,745 | 8/1964 | Sharpes | 56/249 |
| 3,187,492 | 6/1965 | Bergen | 56/249 |

FOREIGN PATENTS OR APPLICATIONS

| 719,424 | 10/1965 | Canada | 56/249 |

Primary Examiner—Robert Peshock
Assistant Examiner—J. N. Eskovitz
Attorney—Vernon A. Johnson and Thomas A. Lennon

[57] ABSTRACT

The bed bar of a reel mower is pivotally supported at each end by a self-aligning rod end type bearing. Said bearings and the bed bar are adjustable vertically with respect to the reel to bring the reel and bed knife into parallel relationship. A screw adjustment device connects the center of the bed bar with the mower frame. Rotation of the screw adjustment device tilts the bed bar and the bed knife carried thereon with respect to the reel to provide the desired shearing relationship therebetween. A detent locks the screw and permits accurate incremental adjustment thereof.

19 Claims, 8 Drawing Figures

PATENTED AUG 1 1972

INVENTOR.
DALE A. KLEMENHAGEN
BY
THOMAS A. LENNON
ATTORNEY

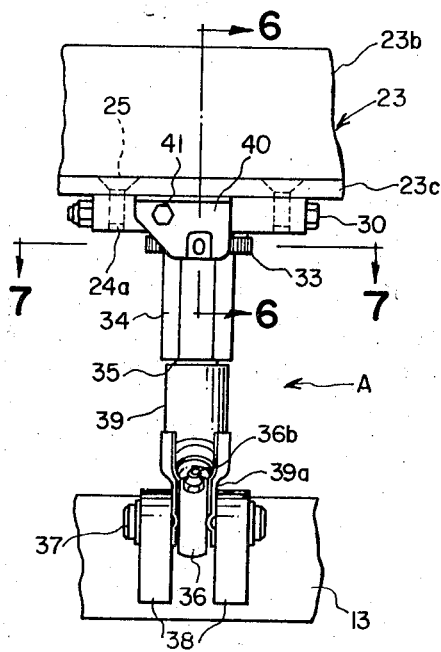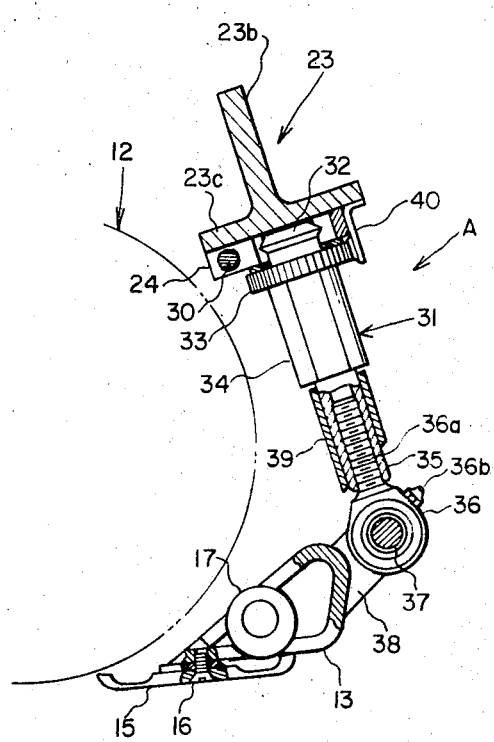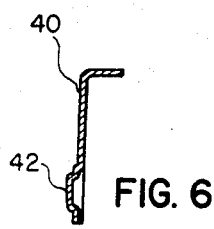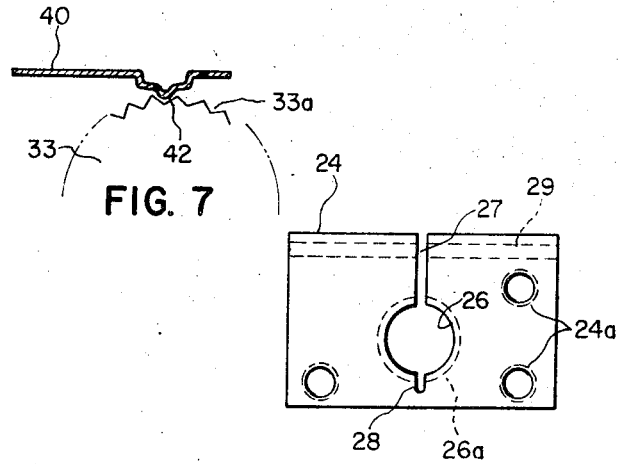

REEL MOWER BLADE ADJUSTMENT

Adjusting the positions of the reel and the bed knife relative to each other has long been a problem in the reel mower art. Because of the cooperative shearing action between the reel blades and the bed knife, accurate adjustment therebetween is necessary and because of the repeated contact therebetween, and because foreign objects such as sticks, stones and wire are commonly encountered, frequent adjustment is normally required.

To date, reel mowers have been provided with multiple adjustment devices, located at opposite ends of the unit, requiring multiple adjustment operations. Because more than one adjustment device has been provided, there is the obvious attendant difficulty involved in making all of the adjustments of the individual devices consistent so that accurate adjustment along the full length of the reel and bed knife is accomplished.

Therefore, it is an important object of this invention to provide a single adjustment mechanism to accomplish the adjustment between the reel and the bed knife in a single, simple, quick operation.

Another object is to provide a single adjustment mechanism which can be easily and accurately operated by a person not skilled in adjusting reel type mowers.

Still another object is to provide an adjustment mechanism which eliminates twisting of the frame when adjusting the bed knife.

Another object is to provide a novel adjustment mechanism which eliminates some of the close grinding tolerances currently required with conventional designs.

Still another object is to provide an adjustment mechanism which maintains the proper adjustment between the reel and the bed knife for longer periods of time than has heretofore been possible, and provides for lubrication of all pivot points.

These and other objects will be apparent from the following description and accompanying drawings in which:

FIG. 1 is a perspective view of a reel mower embodying the adjustment mechanism of this invention, taken from the left rear side thereof, FIG. 2 is a partial side view thereof, with portions broken away, FIG. 3 is a bottom plan view of the mower as viewed substantially along the line 3—3 of FIG. 2 with portions broken away, FIG. 4 is a left side view of the adjusting mechanism, bed bar, and rear cross bar, with portions in section and portions broken away;

FIG. 5 is a rear elevational view of the adjusting mechansim;

FIG. 6 is a sectional view taken on the line 6—6 of FIG. 5;

FIG. 7 is a sectional view taken on the line 7—7 of FIG. 5; and

FIG. 8 is a top plan view of the adjusting plate.

Figure 1:
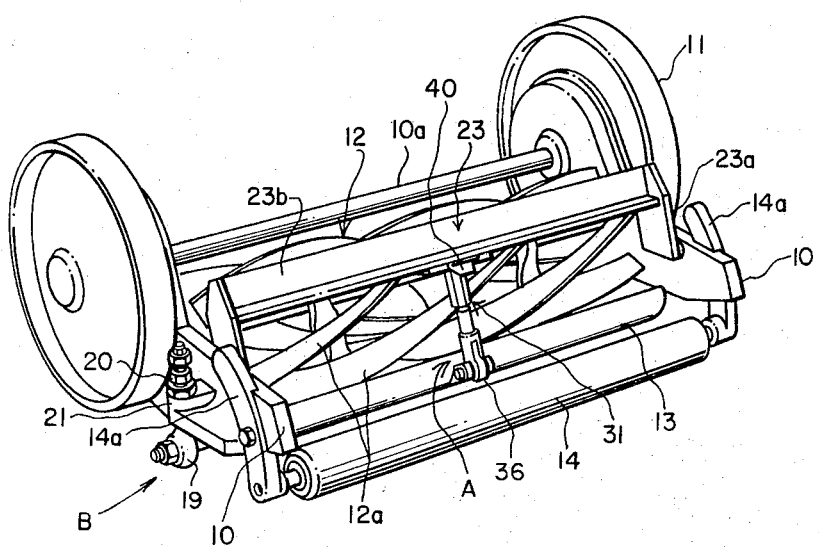

Referring to the drawings, and particularly to FIG. 1, a reel mower is shown therein having a rigid frame which includes a pair of spaced apart side members 10 maintained in spaced apart relationship by a spacer tube assembly 10a, on which frame is mounted a pair of traction ground wheels 11 which drive a conventional reel 12, the helical blades 12a of which cooperate with the bed knife assembly which includes a bedknife 15 carried by the bed bar 13 to cut the grass by cooperative shearing action therebetween. An adjustable roller 14 is located rearwardly and mounted on the side members 10 by a pair of adjustable brackets 14a to provide a rearward ground support for the mower, and to control the height of cut of the mower.

The bed bar 13 is pivotally supported on each end thereof by means of a bearing assembly indicated in its entirety by the letter B. The novel adjustment mechanism of this invention is indicated in its entirety by the letter A.

Figure 2:
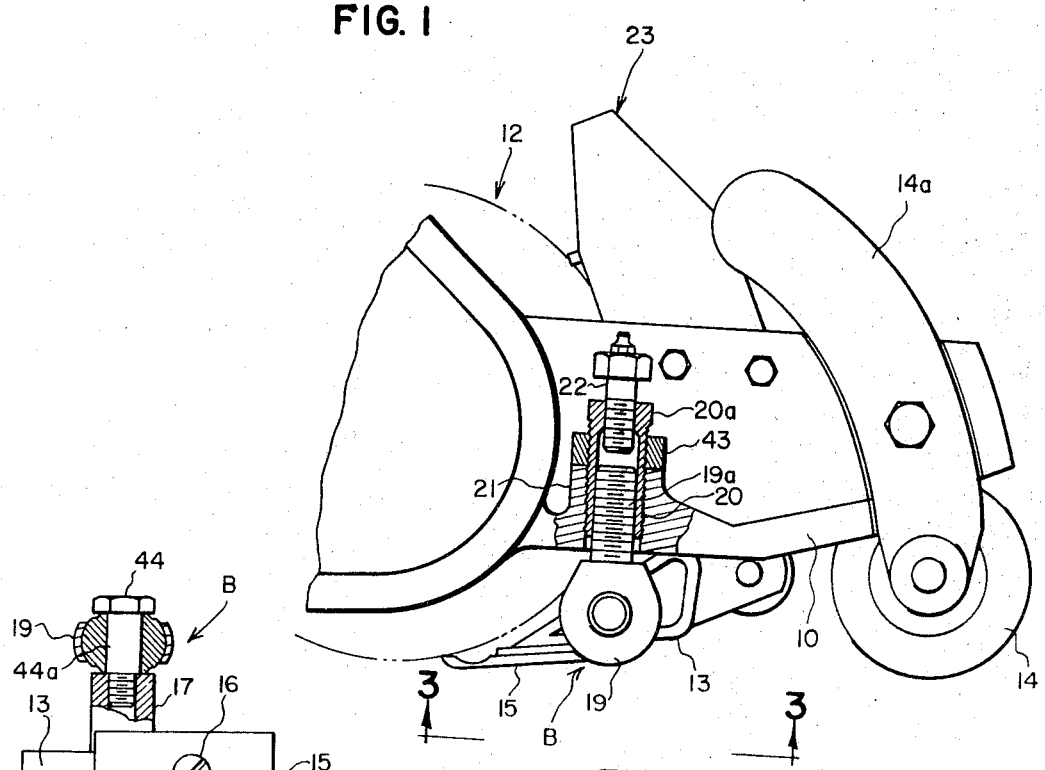
Figure 3:
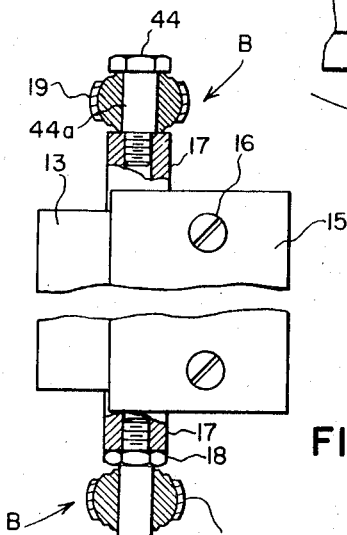

As shown in FIGS. 2, 3, and 4, the bed bar 13 has a bed knife 15 attached to the underside thereof by means of screws 16, the bed knife extending forwardly of the bed bar for cooperative shearing action with the reel blades 12a.

Reference is now made to FIGS. 2 and 3 to consider the pivotal mounting of the bed bar. To pivotally mount the bed bar, each end of the bed bar is provided with a laterally extending internally threaded pivot mounting member or sleeve 17 which is rigidly attached as by weldings to the bed bar, said sleeves being coaxially aligned with each other.

One of the members 17 threadedly receives a pivot stud 18 having a pivot or spindle portion 18a. The other member 17 threadedly receives a shoulder bolt 44 having a pivot or spindle portion 44a.

To pivotally suspend the bed bar from the mower frame, a bearing 19 is provided for the stub 18 and another bearing 19 is provided for the shoulder bolt 44, each of the bearings having an externally threaded bearing rod 19a extending upwardly into a bearing adjustment bolt 20 which is internally and externally threaded, the internal threads threadedly engaging the externally threaded bearing rod 19a. The bolt 20 in turn is threadedly mounted on the frame portion 21 which extends laterally outwardly from the side frame 10. The bolt 20 has a hexagonal head 20a for receiving a tool such as a wrench to effect turning thereof, whereby turning thereof in one direction raises the bearing and turning thereof in the other direction lowers the bearing, and thereby effects vertical adjustment of the bearing and the bed bar and bed knife supported thereby. The upper end of the bolt 20 threadedly receives a grease fitting 22 for lubricating the bearing, and a jam nut 43 is threaded on bolt 20 to hold same in any desired adjusted position.

The bearings 19 pivotally receive and support the pivot portions 18a and 44a respectively of the pivot stud 18 and shoulder bolt 44, thereby supporting the bed bar for pivotal movement about a transverse axis of the mower, whereby the leading cutting edge of the bed knife can be swung towards and away from the reel blades, to effect the desired cutting adjustment therebetween. The bearings are adjustable so that after the mower is assembled, the bed knife and reel can be brought into parallel relationship, that is, with all blades of the reel being equally spaced from the bed knife throughout the entire length of the reel, by selective adjustment of said bearings. Once the bearings 19 are adjusted to accomplish the aforementioned parallelism between reel and bed knife, their setting should remain for a relatively long period of time with the final and more frequent adjustments being accomplished by operation of the adjusting mechanism A.

Attention is next directed to the adjustment mechanism A (best seen in FIGS. 4 and 5) which mechanism interconnects the bed bar and the frame, and holds the bed bar and knife in the desired operational position.

The frame is provided with a rigid rear cross bar 23 which is disposed above the bed bar and rearwardly of the reel, the cross bar having depending legs 23a which are secured to the side frame members 10. The cross bar has an inverted T-shape in cross section, which includes a web 23b and base 23c. An adjustment plate 24 is secured to the underside of the base 23c of the cross bar by means of three screw fasteners 25 which are received by three threaded openings 24a in the plate. The adjustment plate 24 has an opening 26 formed therein, the wall of which is provided with a recessed v-shaped circular annular groove 26a which functions as a track or bearing surface for the pivot head 32 of the adjusting mechanism in a manner hereinafter to be described.

The plate has a slot 27 communicating with said opening and a marginal edge of the plate, with an additional slot 28 being formed diameterically opposite slot 27 to permit sufficient expansion of the plate to permit said pivot head 32 to be installed in the groove 26a of the opening 26. The plate is also provided with a longitudinal bore 29 which receives a bolt 30 for locking the expansible parts of the plate once the pivot head is installed therein.

Attached to the adjustment plate 24 is an internal elongate adjusting member indicated in its entirety by the numeral 31.

This adjusting member includes a beveled or tapered pivot head 32 which seats in the track 26a of the opening 26 in the adjustment plate 24 for free rotation of said head and adjusting member about its longitudinal axis relative to said adjustment plate. The adjusting member further includes a circular disc 33 having serrations 33a formed around the entire periphery thereof, which serrations function to help lock the adjusting member in place and calibrate the indexing of the adjusting member in a manner hereinafter to be described.

Below the circular disc 33 the adjusting member is provided with a hexagonal body portion 34 which is intended to receive a tool such as a wrench for turning the adjusting member and effecting the desired adjustment between the bed knife and the reel. The adjusting member terminates in an elongate internally threaded shank 35 which threadedly receives the externally threaded rod or shank portion 36a of a bearing member 36, said bearing also being provided with a grease fitting 36b. The bearing in turn receives a pivot rod 37, the ends of said rod being supported by a pair of rearwardly extending apertured brackets 38 which are rigidly secured at their inner ends to the rear of the bed bar.

The shank portion of the adjusting member and the bearing are enclosed by a protective sleeve 39 which has depending spacer legs 39a interposed between the bearing and the brackets. Thus, turning the hexagonal head 34 effects lengthening or shortening of the adjusting mechanism, and the bed bar is caused to tilt or pivot about its bearings 19 to effect adjustment of the bed knife relative to the blade of the reel.

To lock the adjusting member against inadvertent movement during use, and to control or calibrate the degree of indexing or adjusting movement, the detent plate 40 is provided, which plate is mounted on the rearwardly facing edge of the adjustment plate 24 by means of a fastener 41. Said plate has formed therefrom an inwardly extending resilient detent tab 42, which tab engages the serrations 33a of the circular disc 33, and by such engagement prevents movement of the adjusting member. However, when positive turning force is applied to the hex-head 34, the tab yields, permitting movement of the entire adjusting member. The serrations are preferably calibrated to provide a predetermined increment of adjustment, such as one-thousandth of an inch, for each serration and the engagement of the tab and the serrations provides an audible click which enables the operator to readily determine the number of increments he has turned the adjusting member.

Thus, the basic adjustment between the reel and the bed knife can be accomplished by the initial settings of the bearings 19 by adjustment of the hex-heads 20a, following which the fine and final adjustment can be easily accomplished by turning of the hex-head 34 of the adjusting mechanism.

Thus, once the parallel relationship between the reel and the bed knife is established by adjustment of the bearing assemblies B, through manipulation of the adjusting bolts 20, any pivotal movement of the bed bar will effect a simultaneous uniform change in the spacing between the reel blades and the bed knife along the entire length thereof. This is readily accomplished by adjusting the length of the adjusting mechanism A by turning the hex-head 34 thereof, whereby lengthening of the assembly A pivots the bed bar in clockwise direction (as seen in FIG. 4) and moves the bed knife towards the reel, and shortening of the assembly pivots the bed bar in counterclockwise direction (as seen in FIG. 4) and moves the bed knife away from the reel. It will also be appreciated that the adjusting assembly A holds and maintains the bed bar and bed knife in any adjusted position.

It will also be noted that each of the bearings 19 and 36 is provided with a grease fitting whereby all pivot points involved in adjusting the bed bar and bed knife are lubricated.

Another important aspect is the support provided for the bed bar. In conventional designs, the bed bar is supported only at its ends, and is susceptible to considerable vibration during use, which materially contributes to uneven wear or rifling of the bed knife. The disclosed arrangement of this invention provides a three point support for the bed bar, namely at the ends as provided by the bearings 19, and centrally as provided by the bearing 36. The additional support provided by the central bearing 36 materially reduces the amplitude of vibration and converts the pattern thereof to one resembling a sine wave, thereby minimizing rifling and materially increasing the life of the bed knife. Best results are attained when the bearing 36 is slightly offset from the transverse center line of the bed bar.

It will, of course, be understood that various changes and modifications of the preferred illustrated embodiment may be made within the spirit and scope of and without departing from this invention, and it is therefore intended to cover all such modification in the appended claims.

What is claimed is:

1. A cutting device comprising,
a stationary cutter member,
a rotatable reel member having a plurality of blades adapted for cooperative shearing action with the stationary cutter,
and means for effecting simultaneous uniform change in the spacing between the cutting edges of the reel blades and the stationary cutter along the entire length thereof,
including bearing means supporting opposite end portions of said stationary cutter for pivotal movement about an axis paralleling the longitudinal axis of said stationary cutter,
a frame supporting said members,
said bearing means being supported by the frame and vertically adjustable relative thereto,
and an elongate adjusting assembly connecting the frame and the stationary cutter,
said assembly being longitudinally adjustable,
the longitudinal adjustment of said assembly effecting tilting movement of said stationary cutter relative to said reel.

2. A cutting device comprising,
a stationary cutter member,
a rotatable reel member having a plurality of blades adapted for cooperative shearing action with the stationary cutter,
and means for effecting simultaneous uniform change in the spacing between the cutting edges of the reel blades and the stationary cutter along the entire length thereof,
wherein said stationary cutter member is provided with pivot means at each end thereof for pivoting said cutter member about an axis parallel to the rotational axis of said reel member,
a rigid frame supporting said members,
adjustable means interconnecting each of said pivot means and said frame for adjusting the pivot axis of said cutter member relative to the rotational axis of said reel member.

3. The cutting device of claim 2,
wherein said means for effecting simultaneous uniform change is longitudinally adjustable structure extending between said cutter member and said frame.

4. The cutting device of claim 2,
wherein said means for effecting simultaneous uniform change is adjustable structure which extends between said frame and said cutter member at a point substantially mid-way between the ends of said cutter member.

5. The cutting device of claim 2,
wherein said means for effecting simultaneous uniform change is adjustable structure extending between said frame and said cutter member and connected with said cutter member at a point which is near but not on the mid-point of the longitudinal axis of said cutter member.

6. A cutting device comprising,
a stationary cutter member,
a rotatable reel member having a plurality of blades adapted for cooperative shearing action with the stationary cutter,
and means for effecting simultaneous uniform change in the spacing between the cutting edges of the reel blades and the stationary cutter along the entire length thereof,
wherein one of said members is provided with pivot means at each end thereof for pivoting said one member about an axis parallel to the rotational axis of said reel member,
a rigid frame supporting said members,
and adjustable means interconnecting each of said pivot means and said frame for adjusting the pivot axis of said one member relative to the rotational axis of said reel member.

7. A reel type lawnmower comprising:
1. a frame including two spaced apart side members;
2. an elongate pivotable supported bedknife assembly transversely located between said side members;
3. a rotatable reel located between said side members and having a plurality of cutting blades adapted for cooperative shearing action with said pivotable bedknife assembly;
4. first means adjustable along one of said side members and including a first connection pivotably supporting one end of said bedknife assembly, said first means providing adjustment of said first pivotable connection and said bedknife assembly relative to said reel;
5. second means adjustable along the other of said side members and including a second connection pivotably supporting the other end of said bedknife assembly, said second means providing adjustment of said second pivotable connection and said bedknife assembly relative to said reel, wherein said first and second means permit said bedknife assembly to be brought into parallel relationship with said reel;
6. a transverse cross bar extending between said side members; and
7. adjustment means attached to said cross bar and said bedknife assembly and located between said side members for effecting simultaneous uniform change in the spacing between the cutting edges of the reel blades and the bedknife assembly along the entire length thereof, said adjustment means including means for locking said adjustment means in place to maintain preselected spacing between the cutting edges of said blades and the bedknife assembly.

8. A reel type lawnmower comprising:
1. a frame including two spaced apart side members;
2. an elongate pivotably supported bedknife assembly transversely extending between said side members;
3. a rotatable reel located between said side members and having a plurality of cutting blades adapted for cooperative shearing action with said pivotable bedknife assembly;
4. first means adjustable along one of said side members and including a first connection pivotably supporting one end of said bedknife assembly, said first means providing adjustment of said first pivotable connection and said bedknife assembly relative to said reel;

5. second means adjustable along the other of said side members and including a second connection pivotably supporting the other end of said bedknife assembly, said second means providing adjustment of said second pivotable connection and said bedknife assembly relative to said reel, wherein said first and second means permit said bedknife assembly to be brought into parallel relationship with said reel; and 6. adjustment means attached to said frame and said bedknife assembly to pivotably adjust said bedknife assembly about said first and second means for effecting simultaneous uniform change in the spacing between the cutting edges of the reel blades and the bedknife along the entire length thereof.

9. A reel type lawnmower according to claim 8 wherein said adjustment means includes means for locking said adjustment means in place to maintain preselected spacing between the cutting edges of said blades and the bedknife assembly.

10. A reel type lawnmower according to claim 9 wherein said adjustment means includes parts in threaded engagement with each other and wherein relative rotation of said parts effects longitudinal adjustment of said adjustment means.

11. A reel type lawnmower according to claim 10 including detent means for holding said adjustable threaded parts against movement relative to each other.

12. A reel type lawnmower according to claim 11 wherein said detent means is resilient and capable of yielding to rotational movement of said adjustable threaded parts when positive turning force is applied to said adjustable threaded parts.

13. A reel type lawnmower according to claim 10 wherein said adjustment means includes a circular disc connected with one of said threaded parts and rotatable simultaneously therewith.

said disc having serrations formed in the periphery thereof, and resilient detent means engageable with said serrations for preventing rotation of said disc and said adjustable part.

14. A reel type lawnmower according to claim 8 wherein said frame includes a rigid member disposed above said bedknife assembly and wherein said adjustment means includes a first apart rotatably connected with said rigid member and a second part pivotally connected with said bedknife assembly.

15. A reel type lawnmower according to claim 14 wherein said first and second parts are threadedly engaged whereby rotation of one of said parts effects movement of the other said part and simultaneous pivotal movement of said bedknife.

16. A reel type lawnmower according to claim 15 wherein said adjustment means includes first detent means carried by said first part, and wherein said frame includes second detent means, said first and second detent means being engaged to resist movement of said first part.

17. A reel type lawnmower according to claim 16 wherein said first detent means comprises a series of serrations, and wherein said second detent means comprises a resilient element engageable with said serrations.

18. A reel type lawnmower according to claim 16 wherein said first detent means is a circular member having a plurality of serrations formed therein about the outer periphery thereof, and wherein said second detent means comprises an elongate spring element having a ridge portion selectively engageable with said serrations for holding said first part against movement.

19. A reel type lawnmower according to claim 18 wherein said spring element will snap into said serrations as said circular member is rotated and emit an audible sound to enable an operator to readily determine the number of increments he has turned said circular member and the distance he has moved said bedknife assembly relative to said reel.

* * * * *